INVENTORS
H. R. Schutz and
L. O. Mankin
BY Rule & Hoge
ATTORNEYS.

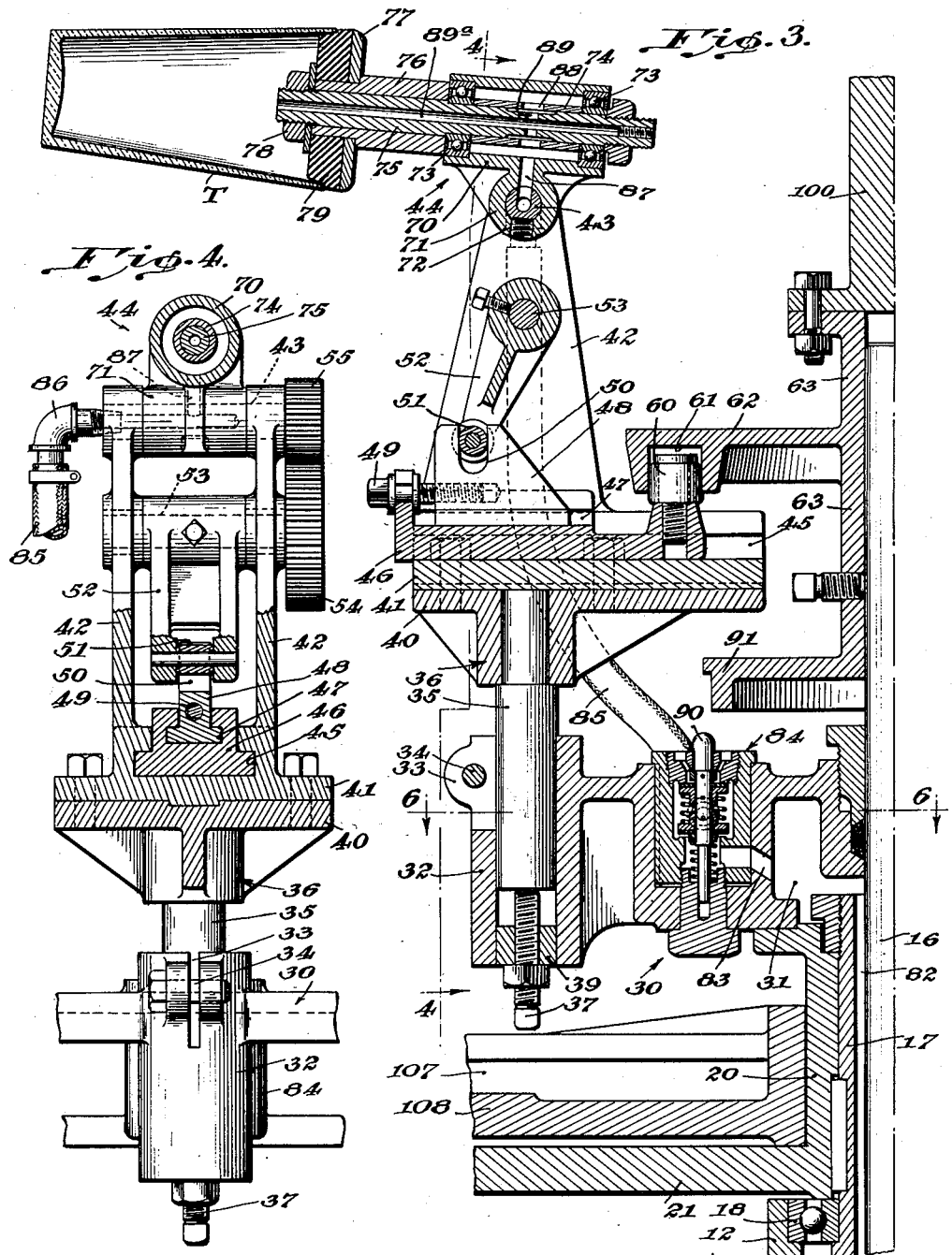

INVENTORS
H. R. Schutz and
L. O. Mankin
BY
Rule & Hoge
ATTORNEYS.

April 23, 1940.  H. R. SCHUTZ ET AL  2,198,565
TUMBLER DECORATING APPARATUS
Filed March 31, 1938  6 Sheets-Sheet 5

INVENTORS
H.R. Schutz and
L.O. Mankin
BY
Rule & Hoge
ATTORNEYS.

April 23, 1940.  H. R. SCHUTZ ET AL  2,198,565
TUMBLER DECORATING APPARATUS
Filed March 31, 1938  6 Sheets-Sheet 6

INVENTORS
H. R. Schutz and
L. O. Mankin
BY Rule & Hoge
ATTORNEYS.

Patented Apr. 23, 1940

2,198,565

UNITED STATES PATENT OFFICE 2,198,565

TUMBLER DECORATING APPARATUS

Harold R. Schutz and Lawrence O. Mankin, Toledo, Ohio, assignors to Libbey Glass Company, a corporation of Ohio Application March 31, 1938, Serial No. 199,079

15 Claims. (Cl. 101—124)

The improved stenciling apparatus comprising the present invention is primarily adapted for use in applying a vitreous enamel composition or paint to the tapered frusto-conical or cylindrical sides of tumblers, although other uses therefor are contemplated and the apparatus, by slight modification thereof, well within the scope of the appended claims, may be employed in the lettering or decorating of the tapered or cylindrical sides of other articles of glassware such as bottles, jars, and the like.

The principal object of the invention is to provide a fully automatic machine which will receive the undecorated tumblers in an inverted position; successively orient the tumblers and convey the same, properly oriented for cooperation with the decorating instrumentalities, to a decorating zone; apply the decoration to the tumblers in the decorating zone while they are moving therethrough, and finally restore the decorated tumblers to their initial inverted position for removal from the machine.

In carrying out the above mentioned object, the invention contemplates the provision of an apparatus wherein a horizontally disposed stencil screen which is capable of movement in its own plane is moved horizontally while in tangential rolling line contact with the tapered surface of a bodily moving tumbler undergoing decoration, while at the same time decorating material is applied to the tapered surface of the tumbler by the spreading action of a moving squeegee which is maintained in contact with the screen along the shifting line of contact between the screen and surface undergoing decoration.

Other objects of the invention not at this time enumerated will become apparent as the following description ensues.

In the accompanying drawings:

Fig. 3 is an enlarged vertical sectional view taken substantially centrally and radially through one head of the machine;

Fig. 4 is a sectional view taken substantially along the line 4—4 of Fig. 3;

Brief description of the apparatus

Briefly, the apparatus comprises a stationary supporting structure upon which there is mounted for continuous rotation about a vertical axis a carriage having associated therewith a plurality of tumbler supporting heads. Each tumbler supporting head includes a tiltable chuck for the tumblers which are to be decorated and, upon rotation of the carriage, the heads pass successively through a tumbler receiving and removal zone and through a decorating zone. In the tumbler receiving and removal zone the chucks project vertically upward and the operator of the apparatus removes the decorated tumblers from the chucks and substitutes therefor the undecorated ones which are placed upon the chucks in an inverted position.

The decorating instrumentalities occupy positions in the vicinity of the decorating zone and include the usual stencil screen which makes tangential rolling line contact with each tumbler undergoing decoration and the usual squeegee which makes contact with the screen along the line of contact between the screen and tumbler. However, since the tumblers are moving continuously and pass through the decorating zone at a uniform rate of speed, it is necessary to decorate the same "on the run" so to speak, and accordingly provision is made for causing the entire set of decorating instrumentalities to oscillate about the axis of the rotating carriage without destroying their usual decorating movements relative to each other, these decorating instrumentalities following the motions of the carriage in one direction while applying the decorations to each tumbler, and moving in the opposite direction to arrive at the starting point in time to receive the next adjacent oncoming tumbler.

In moving from the tumbler receiving and removal zone to the decorating zone, the tiltable chucks assume a recumbent position in which the tapered sides of the tumblers thereon become substantially tangential to the plane of the stencil screen. In passing through the decorating zone the tumblers are moved into tangential rolling line contact with the screen which passes thereover in one direction while at the same time the moving squeegee remains centered upon the tumblers to force coloring material through the screen and apply the decorations to the tapered sides thereof.

After the decorations have been applied to the tumblers, the latter are lowered slightly by a further tilting movement of the chucks to clear the screen. Shortly thereafter the chucks are gradually upended as they approach the tumbler receiving and removal zone.

The operation is continuous.

General description of the apparatus

Figure 1:
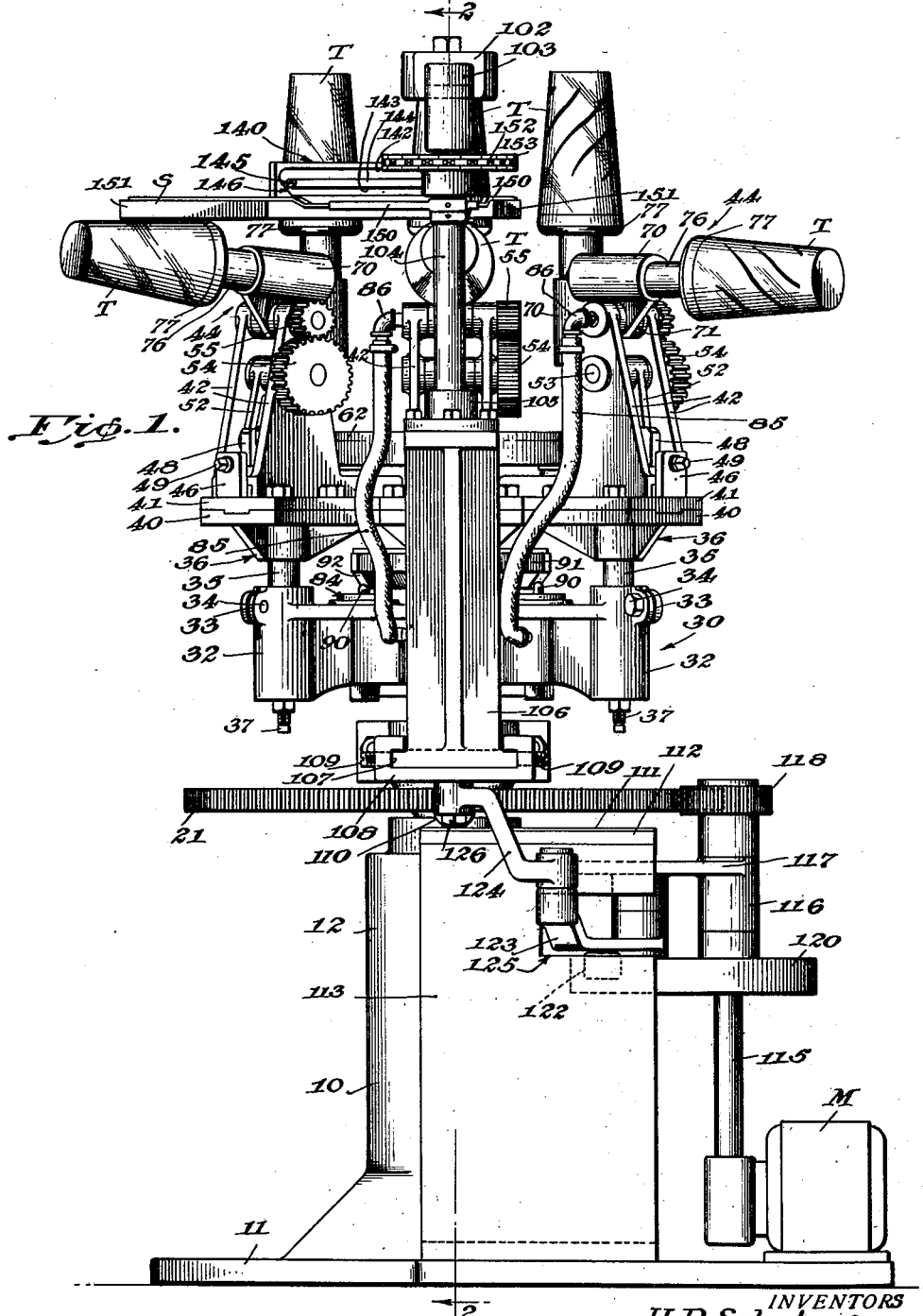
Fig. 1 is a side elevational view of a tumbler decorating apparatus manufactured in accordance with the principles of the present invention.
Figure 2:
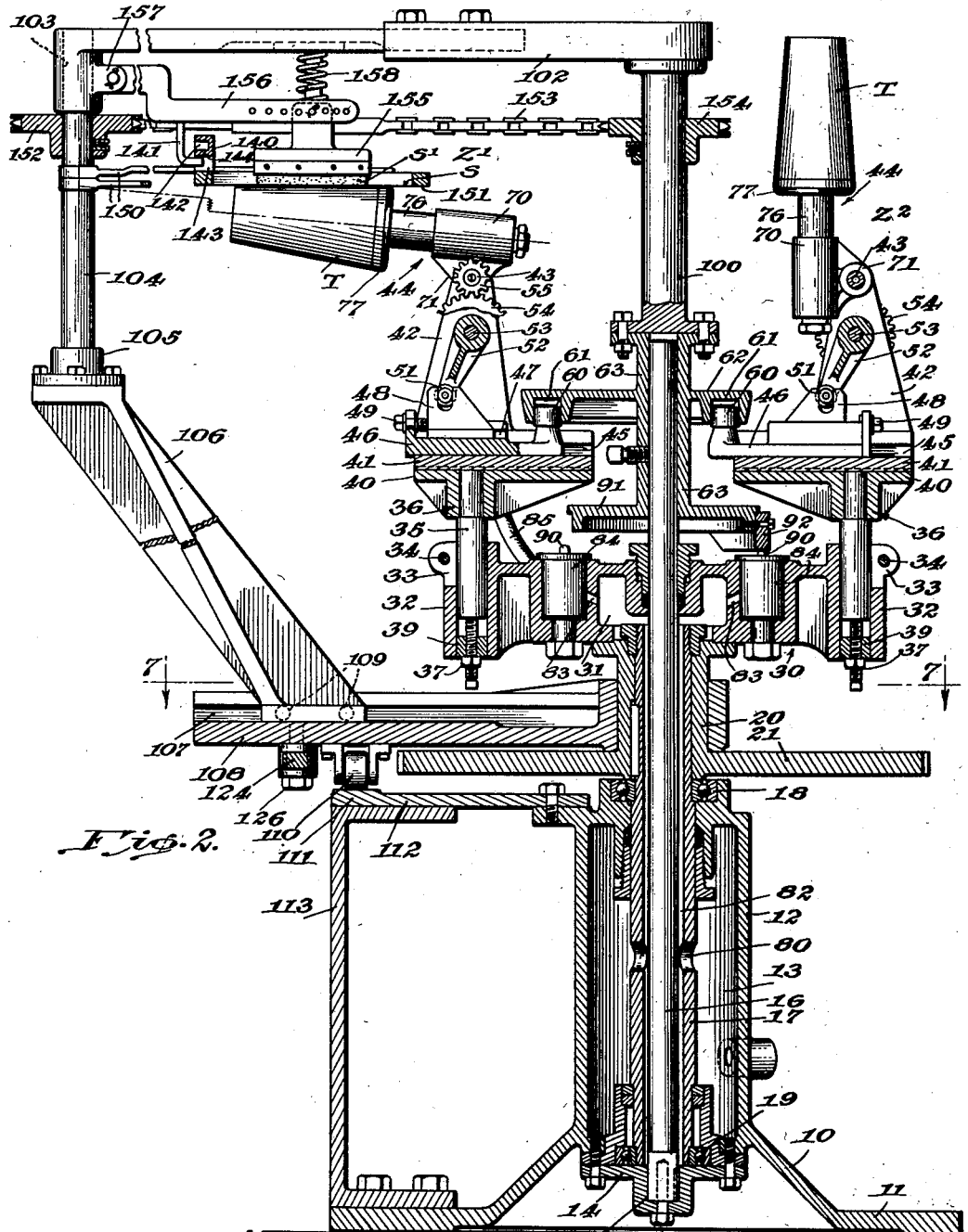
Fig. 2 is a vertical sectional view taken substantially along the line 2—2 of Fig. 1 with certain parts thereof shown in section.

Referring now to Figs. 1 and 2, the apparatus involves in its general organization a base casting 10 including a base 11 and a hollow central vertical column 12 providing a vacuum chamber 13, the lower end of which is closed by means of a plate 14 having a square socket 15 formed centrally and axially therein in which is anchored the lower square end of a vertical non-rotatable central supporting rod 16 which projects upwardly beyond the confines of the chamber 13. Spaced from and surrounding the shaft 16 is a rotatable sleeve 17 which is journalled in upper and lower antifriction bearings 18 and 19 and projects upwardly beyond the confines of the chamber 13 and has keyed thereto in its upper regions a rotary sleeve 20 which has integrally formed therewith a relatively large gear 21.

Figure 6:
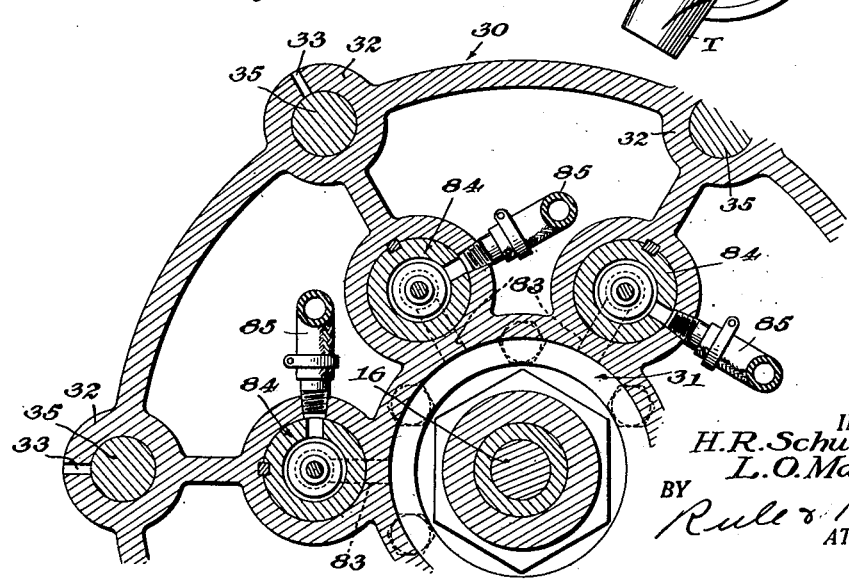
Fig. 6 is a sectional view taken substantially along the line 6—6 of Fig. 3.

Supported upon the gear 21 and mounted for rotation about the central supporting shaft 16 is a rotary carriage 30 (see also Figs. 3 and 6) having an annular vacuum chamber 31 formed therein. A plurality of spaced clamping bosses 32 are integrally formed on the carriage 30 in the peripheral regions thereof. Each boss 32 is split as at 33 in the upper region thereof and a clamping bolt 34 extending across the split portion serves to clamp a supporting rod 35 for a tumbler supporting head 36 in any desired position of vertical adjustment with respect to the carriage 30. An adjusting screw 37 which extends through a plug 39 at the bottom of the sleeve permits nicety of adjustment of the height of the head 36 on the carriage 30.

The tumbler supporting heads

The individual tumbler supporting heads 36, of which there may be any desired number, each comprises a casting 40 (Figs. 3 and 4) having a chuck supporting member 41 secured to its upper surface. The chuck supporting member includes a pair of horizontally spaced vertical standards 42 in the upper ends of which there is journalled a horizontal hollow rock-shaft 43 to which there is secured for rocking movement therewith a tumbler supporting chuck assembly designated in its entirety at 44.

The chuck supporting member 41 is provided with a radial slideway 45 in which there is mounted a reciprocable slide block 46 provided lengthwise of its upper side with a guideway 47 in which a bracket 48 is adjustably secured by means of an adjusting screw 49. The bracket 48 is formed with a slot 50 which is designed to receive a roller 51 carried at the lower end of a swingable bifurcated arm 52 between the bifurcations thereof. The arm 52 is adjustably secured to a horizontal rock-shaft 53 which is supported between the standards 42 below the rock-shaft 43. Thus it will be seen that reciprocation of the slide block 46 in the slideway 45 will operate through the bracket 48 and arm 52 to actuate the rock-shaft 53 and impart rocking movement through the gears 54 and 55 to the rock-shaft 43 upon which the chuck assembly 44 is mounted.

In order to reciprocate the slide block 46 (Fig. 2) in the slideway 45, the inner end of the member 46 is provided with a cam roller 60 which travels in a cam groove 61 (see also Fig. 5) formed in a cam plate 62 which is integrally formed on a cam sleeve 63 adjustably secured to the central supporting rod 16. The cam groove 61 is so designed that it moves the slide block 46 radially outward when the chuck assembly 44 is in the vicinity of a decorating zone $Z^1$, and that the slide block 46 is drawn radially inward when the chuck assembly 44 is in the vicinity of a tumbler receiving and discharging zone $Z^2$. It will be seen that when the chuck assembly 44 is in the vicinity of the decorating zone $Z^1$ the entire assembly is in a more or less recumbent position, whereas when in the vicinity of the tumbler receiving and discharging zone $Z^2$, the assembly is substantially vertical. The cam groove 61 is formed with an offset portion 64 into which the roller 60 moves when the chuck assembly 44 is about to leave the decorating zone in order to lower the tumblers T away from the screen and cause the same to clear the latter as will be set forth hereinafter.

The chuck assemblies

Referring now to Fig. 3, each chuck assembly 44 comprises a tubular carrier 70 which is secured to the rock-shaft 43 by means of a boss 71. A set screw 72 extending through the boss 71 maintains proper angularity of the entire chuck assembly 44 on the rock-shaft 43. Extending axially through the tubular carrier 70 and supported for rotation therein by means of antifriction bearings 73 which are maintained in spaced relationship therein by means of a tubular spacer 74 is a hollow chuck supporting rod 75. A tubular spacer 76 surrounds the rod 75 in the forward region thereof and serves to space a circular chuck 77 from the tubular carrier 70. A clamping nut 78 is threaded upon the end of the chuck supporting rod 75 and clamps the chuck 77 firmly against the spacer 76, thus maintaining the chuck in its proper relation on the end of the tubular chuck supporting rod 75. The chuck 77 is provided with a resilient face plate 79 which may be formed of leather, rubber, or similar material and against which the rim portions of the tumblers T undergoing decoration are adapted to bear.

Vacuum connections to the chuck assemblies

In order that vacuum may be applied to the chuck 77 shortly after the tumbler supporting head 36 leaves the tumbler receiving and removal zone $Z^2$ with a tumbler T thereon, and in order that such vacuum at the chuck may be relieved as the head again approaches the zone $Z^2$ to permit the decorated tumbler to be removed from the chuck, means is provided for periodically applying such vacuum to the chuck 77 from the chamber 13 in the base casting 10. Toward this end, (Figs. 2 and 3), constant communication between the chamber 13 and chuck 77 is established by apertures 80 formed in the rotatable sleeve 17 which establish communication between the chamber 13 and the annular space 82 existing between the sleeve and central rod 16. The space 82 is in communication with the vacuum chamber 31 provided in the carriage 30 and this vacuum chamber 31 communicates through a series of ports 83 and valves 84 mounted in the carriage 30 with individual flexible conduits 85 (Figs. 3 and 4) which in turn communicate with the interior of the hollow rock-shaft 43 by means of elbow fittings 86. The interior of each rock-shaft 43 is in constant communication with the interior of its respective tubular carrier 70 through a port 87 (Fig. 3) and, by means of radial apertures 88 and 89 formed in the spacer 74 and chuck supporting rod 75 respectively, and an axial passageway 89a in the latter, vacuum is finally applied to the chuck 77.

The various valves 84 are identical in construction and no claim is made in this application to any novelty connected therewith. These valves are shown and described in United States Patent No. 2,134,739, issued November 1, 1938, to Harold R. Schutz, for a Banding machine, and the valves 84 herein shown are substantially identical therewith both as to construction and operation. It is deemed sufficient to state that each valve 84 includes a plunger 90 (Fig. 3) designed for cooperation with a cam 92 which is carried by a stationary cam plate 91 formed on the cam sleeve 63. When the plunger 90 is depressed, the valve is closed and communication between the chamber 31 and flexible conduit 85 through the valve 84 is interrupted while at the same time the conduit 85 is bled to the atmosphere. Conversely, when the plunger 90 is elevated, the valve is open and communication through the valve is made possible.

The plunger 90 is normally elevated and in order to depress the same to interrupt the supply of vacuum to the chuck 77 and to connect the vacuum line 85 to the atmosphere, the cam member 92 (Fig. 2) is adapted, upon rotation of the carriage 30, to periodically be engaged by the plunger 90 when the latter passes therebeneath to depress the plunger as the tumbler supporting head 36 enters the tumbler receiving and removal zone Z². As the tumblers leave the tumbler receiving and removal zone Z², the plungers 90 are released by the cam 92 to establish vacuum communication through the valves 84 between the chucks 77 and the vacuum chamber while at the same time excluding atmospheric pressure from the chucks.

*Decorating instrumentalities in general*

Figure 5:
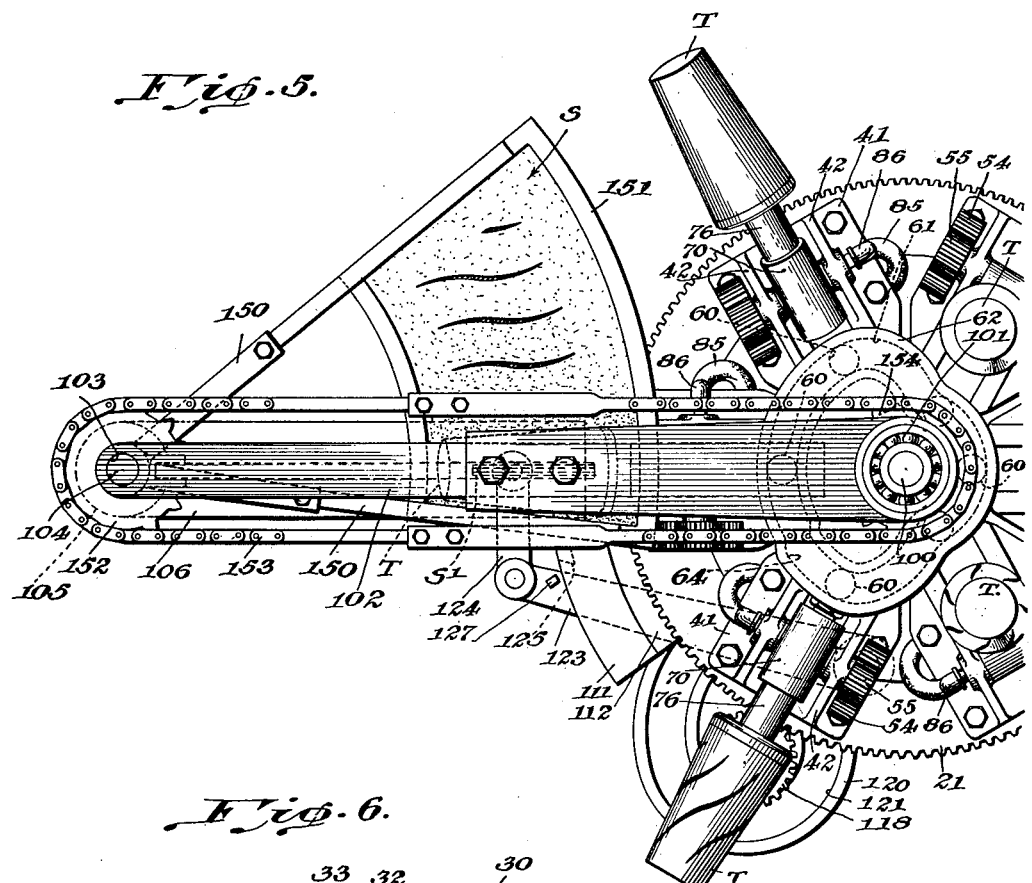
Fig. 5 is a fragmentary top plan view of the apparatus.

Referring now particularly to Figs. 2 and 5, the tumbler decorating instrumentalities include a stencil screen S which is oscillatable in a horizontal plane about a shiftable vertical axis which itself is oscillatable about the axis of the central supporting rod 16, and a squeegee S¹ which oscillates with the shiftable axis in radial alignment therewith. Stated in other words, the stencil screen and squeegee, when considered as a decorating entirety, oscillate about the central axis of the machine while the stencil screen alone is capable of independent oscillation relative to the squeegee. Toward these ends, a stationary column 100 is secured to the upper end of the cam sleeve 63 and supports at its upper end in anti-friction bearings 101 the inner end of an extensible horizontal upper beam 102 which is capable of oscillation in a horizontal plane about the axis of the central rod 16 and column 100. The outer end of the extensible beam 102 is formed with a socket 103 into which extends the upper end of a vertical rock-shaft 104. The lower end of the rock-shaft 104 extends into a socket 105 secured to the outer upper end of an inclined standard 106 which is radially adjustable in a slideway 107 provided on a lower horizontally swingable beam 108 which is capable of oscillation in a horizontal plane about the axis of the central rod 16. Set screws 109 anchor the standard 106 in any desired position of radial adjustment. The inner end of the lower beam 108 is pivoted to the rotary sleeve 20 and is supported upon the gear 21 while the outer end thereof is supported by means of a roller 110 on a runway 111 formed on the upper surface of a table 112. A curved support 113 extending between the base 11 and table 112 supports the outer end or region of the latter.

Figure 7:
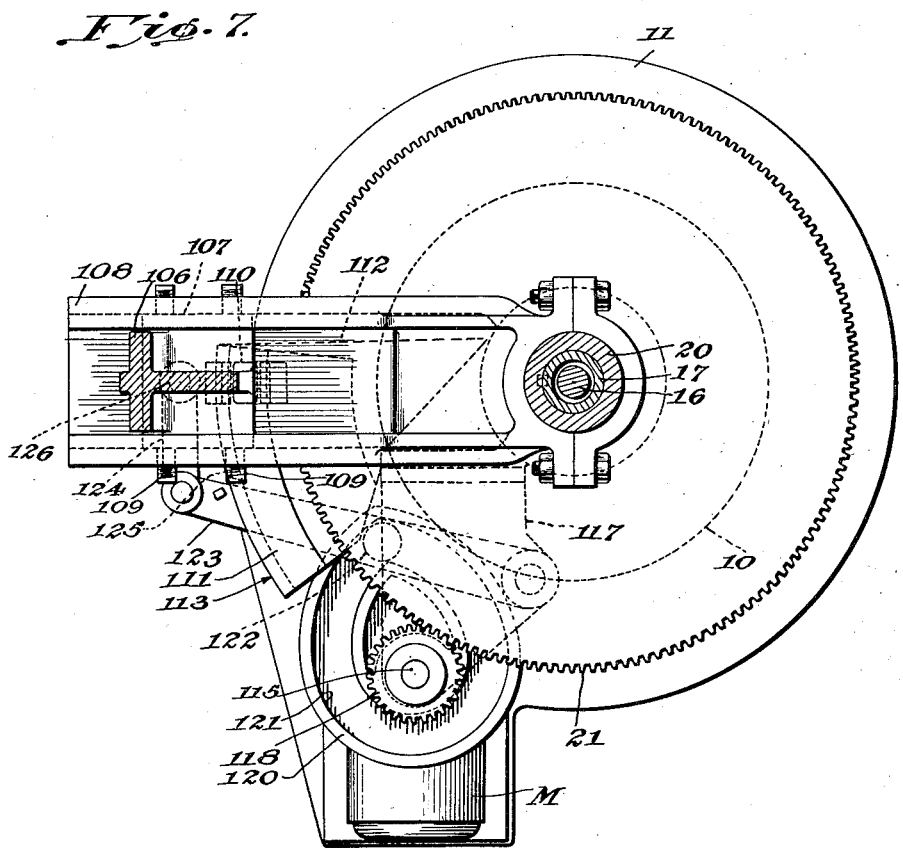
Fig. 7 is a sectional plan view taken substantially along the line 7—7 of Fig. 2.

In order to impart oscillatory motion to the lower beam 108 and consequently oscillate the entire set of decorating instrumentalities about the axis of the central rod 16, and at the same time impart rotary motion to the carriage 30, an electric motor M which is supported on the base 11 is geared to a vertical drive shaft 115 which is rotatably supported in a bearing 116 formed on a web 117 secured to the casing 10. A pinion 118 mounted on the upper end of the shaft 115 meshes with the gear 21 to drive the carriage 30. A substantially pear-shaped cam member 120 (Figs. 1 and 7) secured medially to the shaft 115 is provided with a cam race 121 or groove into which extends a cam roller 122 which is mounted medially on a rock-arm 123 pivoted to the web 117 and which extends through a slot 125 formed in the support 113. A connecting rod 124 has one end thereof pivoted by a pin 126 to the lower swinging beam 108 at a point adjacent the outer end thereof. Thus it will be seen that as the carriage 30 is rotated at a constant rate of speed, the lower beam 108, and consequently the entire set of decorating instrumentalities, is oscillated about the axis of the central rod 16. A lug 127 formed on the arm 123 prevents collapse of the two members 123, 124, and determines the extreme limiting position of the lower beam 108.

*The stencil screen*

The mountings for the stencil screen S and squeegee S¹ (Figs. 2 and 5) in the case of the screen comprise a pair of stencil screen arms 150 which are rigidly secured to the rock-shaft 104 for oscillation therewith about the axis thereof. The free ends of the arms 150 support therebetween a screen frame 151 of conventional form from which the screen S is suspended. A sprocket 152 secured to the rock-shaft 104 is connected by means of an extensible chain 153 to a similar sprocket 154 secured to the stationary column 100. Thus it will be seen that as the beam 102 oscillates limited rocking movement is imparted to the rock-shaft 104 by virtue of the fact that the sprocket 154 is fixed while the sprocket 152 connected thereto is capable of angular movement with the rock-shaft 104. Angular oscillation of the rock-shaft 104 imparts oscillatory swinging movement to the stencil screen arms 150 and to the screen S in a horizontal plane about the axis of the rock-shaft 104.

*The squeegee*

The squeegee S¹ (Fig. 2) is mounted in a holder 155 of conventional design which is adjustably suspended from a squeegee arm 156 which is pivoted for limited swinging movement in a vertical plane to a bracket 157 formed on the outer end of the extensible beam 102. A coil spring 158 disposed between the beam 102 and squeegee arm 156 normally urges the squeegee S¹ downwardly into operative decorating engagement with the stencil screen S.

The squeegee elevating device

During oscillation of the screen S in one direction beneath the squeegee S¹, the squeegee remains in contact with the screen and forces coloring material placed on the latter through the pervious portions thereof and onto the surface of the tumbler T therebeneath. During the return movement of the screen in the other direction, means is provided for elevating the squeegee from the screen in order to permit the same to clear the coloring material thereon. Toward this end, one edge of the screen frame 151 has secured thereto a squeegee elevating device 140 (Figs. 1 and 2) which cooperates with a depending finger 141 provided on the squeegee arm 156. This device comprises a frame-like structure having an upper slot 142 and a lower slot 143 separated by a rib 144. During the decorating stroke of the screen S, the finger 141 traverses the lower slot 143, relatively speaking, and, near the end of the stroke, passes upwardly on an incline 146 and trips a pivoted latch 145 (Fig. 1 only) beneath which it passes and upon which it comes to rest at the end of the screen stroke. Movement of the screen in the other direction carries the finger 141 over the latch 145 and into the upper slot 142 which it traverses during the return stroke of the screen and finally it drops by gravity from the end of the rib 144 into the lower slot 143 at the end of the return stroke of the screen.

Operation of the apparatus

In the operation of the apparatus, the rotary motion of the carriage 30 is continuous, the motor M operating to drive the gear 21 at a constant rate of speed.

As the various heads 36 with the decorated tumblers T thereon approach the tumbler receiving and removal zone Z², the cam plate 62 (Fig. 2), operating upon the slide blocks 46 in the manner previously described, cause these blocks to be drawn radially inwardly, thus actuating the bifurcated arms 52 and upending the chuck assemblies 44.

As the heads 36 arrive at the tumbler receiving and removal zone Z², the cam 92 depresses the plungers 90 of the valves 84 thereby serving to shut off the supply of vacuum to the chucks 77 and to vent the chucks to the atmosphere in the manner previously described. The operator of the apparatus is thus enabled to remove the decorated tumblers from the upended chuck assemblies 44 at the zone Z² and in their stead to substitute undecorated ones.

As soon as the heads 36 leave the zone Z², the cam plate 62 operates to move the slide members 46 radially outwardly, thus moving the chuck assemblies to a recumbent position preparatory to presentation of the tumblers T to the stencil screen for decoration.

Figure 8:
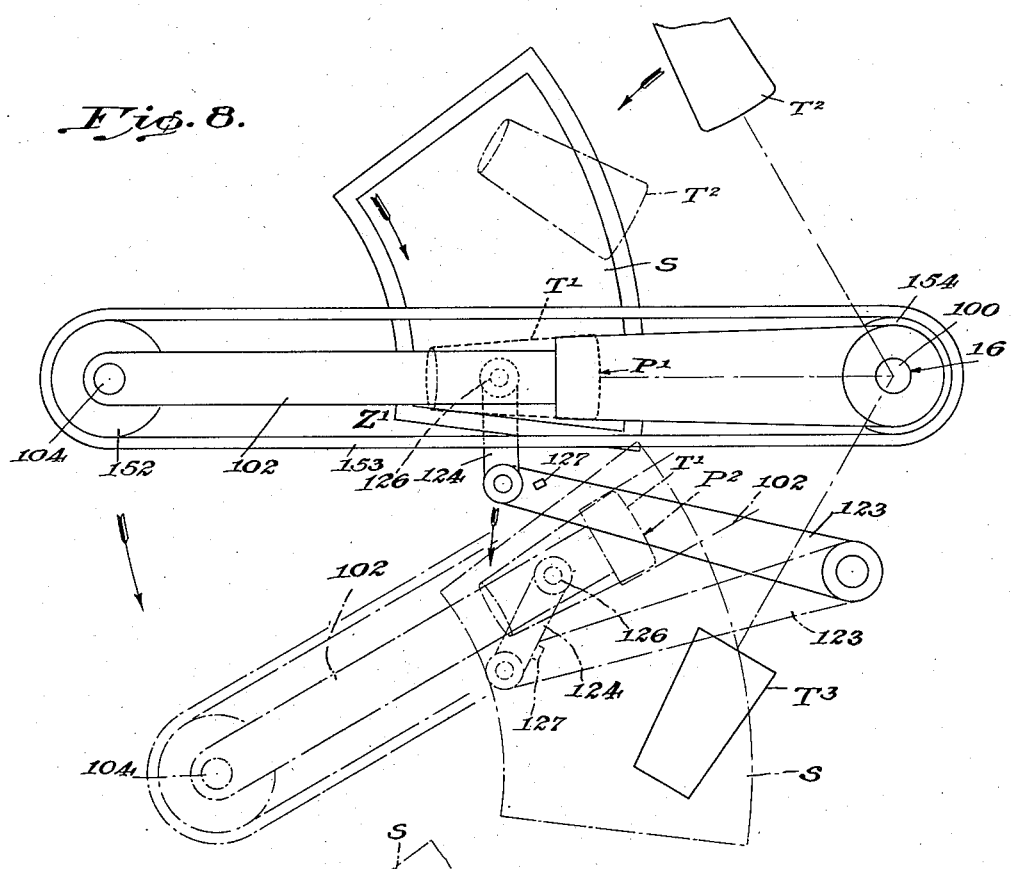
Figs. 8 and 9 are diagrammatic views illustrating the progressive approach of the tumblers to the decorating zone; the decoration of the tumblers in the decorating zone; and the progressive recession of the tumblers from the decorating zone.

Referring now to Fig. 8, the extensible beam 102 is shown in full lines as being centered above a tumbler T¹ which is in the decorating zone Z¹ in a position indicated at P¹. The screen S is in one extreme position thereof with respect to the beam 102 and is about to commence its decorating stroke in the direction indicated by the adjacent arrow. The squeegee has been lowered into contact with the screen which in turn is in contact with the tumbler T¹. An undecorated tumbler T² is shown in full lines as approaching the decorating zone Z¹ while a decorated tumbler T³ is shown leaving the same.

During movement of the tumbler T¹ from the position indicated at P¹ to the broken line position indicated at P², the beam 102 moves to the broken line position thereof in the direction indicated by the adjacent arrow. Simultaneously, the screen moves relative to the beam to the other extreme position thereof also indicated in broken lines. During such movement of the screen, the decoration is applied to the tumbler T¹.

Figure 9:
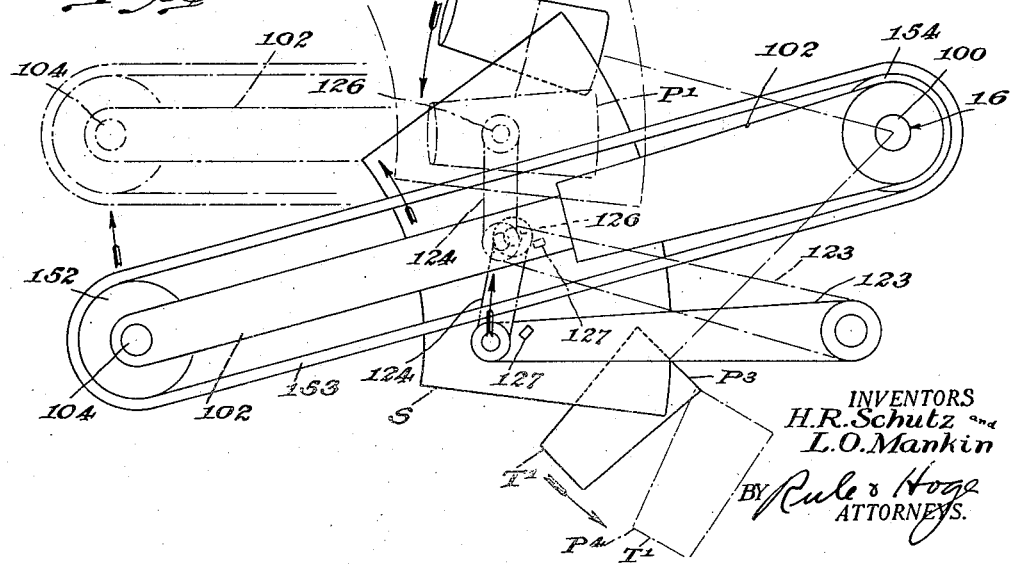

In moving from the position indicated at P² in Fig. 8 to the position indicated at P³ in full lines in Fig. 9, the cam roller 60 (Fig. 5) enters the offset portion 64 of the cam groove 61 and imparts a slight outward radial movement to the slide 46 and causes the tumbler to be lowered slightly to clear the screen. With the tumbler in the position indicated at P³, the beam 102 has commenced its return movement in the direction indicated by the adjacent arrow. The squeegee has become elevated and is out of contact with the screen.

When the return movement of the beam 102 has been completed and the screen assumes its decorating relation to the next adjacent tumbler T² (Fig. 9), the tumbler T¹ assumes the position indicated in broken lines at P⁴ and the chuck assembly 44 upon which the tumbler is mounted commences to become upright preparatory to arrival at the tumbler receiving and removal zone Z².

The operation of the apparatus is continuous.

Modifications may be resorted to without departing from the spirit of the appended claims.

We claim:

1. In an apparatus for decorating tumblers by a stenciling process, a rotatable carriage, a plurality of normally vertical tumbler supporting chucks mounted on said carriage, means for rotating the carriage to move the chucks successively through a decorating zone, decorating instrumentalities including a stencil screen positioned in the decorating zone, means operable upon and due to rotation of the carriage for tilting said chucks throughout a predetermined angle and thereby moving the tumblers thereon into tangential rolling line contact with the stencil screen preparatory to movement of the chucks through the decorating zone, and means also operable upon rotation of the carriage for further tilting the chucks in the same direction to cause the tumblers to clear the stencil screen as the chucks leave the decorating zone.

2. In an apparatus for decorating tumblers, a rotatable carriage, a plurality of normally vertical tumbler supporting chucks mounted on said carriage, means for rotating the carriage to move the chucks successively through a tumbler receiving and removal zone and a decorating zone, decorating instrumentalities positioned in the decorating zone, means operable upon and due to rotation of the carriage for tilting said chucks and thereby moving the tumblers thereon into decorating relation with the decorating instrumentalities preparatory to movement of the chucks through the decorating zone, means normally connecting said chucks to a source of vacuum, and means operable as the chucks move through the tumbler receiving and removal zone for discontinuing the supply of vacuum to the chucks.

3. In an apparatus for decorating tumblers, a rotatable carriage, a tumbler supporting head mounted on the carriage, said head including a tiltable tumbler supporting chuck movable from a substantially vertical tumbler receiving position to a substantially horizontal tumbler decorating position and vice versa, means for rotating the carriage to move said head successively through tumbler receiving and decorating zones, a slide mounted on said head for movement radially of the carriage, cam means operable upon and due to rotation of the carriage for moving said slide, and means operable upon movement of the slide in one direction for tilting the chuck in one direction and operable upon movement of the slide in the opposite direction for tilting the chuck in the opposite direction.

4. In an apparatus for decorating tumblers, a rotatable carriage, a tumbler supporting head mounted on the carriage, said head including a tiltable tumbler supporting chuck movable from a substantially horizontal tumbler decorating position to a substantially vertical tumbler receiving position and vice versa, means for rotating the carriage to move said head successively through tumbler receiving and tumbler decorating zones, a slide mounted on said head for reciprocal movement radially of the carriage, cam means operable upon rotation of the carriage for moving said slide, a gear on said chuck, and means operable upon and due to reciprocation of the slide for oscillating said gear.

5. In an apparatus for decorating tumblers by a stenciling process, decorating instrumentalities for applying decorations to the tumblers in a decorating zone including a stencil screen and a squeegee therefor, means for continuously and successively moving a series of tumblers through said zone, means for moving the stencil screen and squeegee relative to each other to force coloring material through the screen, and means for moving said decorating instrumentalities bodily with both the screen and squeegee in decorating relation to and in register with the tumblers passing through said zone.

6. In an apparatus for decorating tumblers by a stenciling process, decorating instrumentalities for applying decorations to the tumblers in a decorating zone including an oscillatable stencil screen and a relatively stationary squeegee therefor, means for oscillating the screen, means for continuously and successively moving a series of tumblers through said zone, and means for bodily moving said decorating instrumentalities with both the screen and squeegee in decorating relation to and in register with the tumblers passing through said zone.

7. In an apparatus for decorating tumblers, a rotatable carriage, a plurality of tumbler supporting chucks mounted on said carriage, means for rotating the carriage to move the chucks successively through a tumbler decorating zone, decorating instrumentalities positioned in the decorating zone, and means for oscillating said decorating instrumentalities about the axis of rotation of the carriage in timed relation to the rotation of said carriage.

8. In an apparatus for decorating tumblers by a stenciling process, a rotatable carriage, a plurality of tumbler supporting chucks mounted on said carriage, means for rotating the carriage to move the chucks successively through a tumbler decorating zone, decorating instrumentalities positioned in the decorating zone including a stencil screen and a squeegee therefor, means for moving the stencil screen and squeegee relative to each other to perform the decorating operation on the tumblers, and means for oscillating said decorating instrumentalities bodily about the axis of rotation of the carriage in timed relation to the rotation thereof.

9. In an apparatus for decorating tumblers by a stenciling process, a rotatable carriage, a plurality of tumbler supporting chucks mounted on said carriage, means for rotating the carriage to move the chucks successively through a tumbler decorating zone, decorating instrumentalities positioned in the decorating zone including an oscillatable stencil screen and a relatively stationary squeegee therefor, means for oscillating said decorating instrumentalities bodily about the axis of rotation of the carriage in timed relation to the rotation thereof, and means for oscillating the stencil screen periodically in timed relation to the oscillation of said decorating instrumentalities.

10. In an apparatus for decorating tumblers by a stenciling process, a rotatable carriage, a plurality of tumbler supporting chucks mounted on said carriage, means for rotating the carriage to move the chucks successively through a tumbler decorating zone, decorating instrumentalities positioned in the decorating zone including an oscillatable stencil screen and a relatively stationary squeegee therefor, cam means for oscillating said decorating instrumentalities bodily about the axis of rotation of the carriage in timed relation to the rotation of the carriage, and means for oscillating the stencil screen periodically in timed relation to the oscillation of said decorating instrumentalities.

11. In an apparatus for decorating tumblers by a stenciling process, a stationary central support, a rotatable carriage mounted on said support for rotation thereon about the axis thereof, a plurality of tumbler supporting chucks mounted on said carriage, means for rotating the carriage to move the chucks successively through a tumbler decorating zone, a horizontal beam pivoted at one end to the support for oscillation about the axis thereof, a vertically extending rock-shaft mounted for oscillation on the free end of the beam, a stencil screen assembly including a stencil screen mounted on said rock-shaft for oscillation therewith, a squeegee assembly including a squeegee mounted on the beam and movable therewith, a sprocket on said rock-shaft, a sprocket on said stationary support, a chain extending over said sprockets, and means for oscillating said beam in timed relation to the rotation of the carriage.

12. In an apparatus for decorating tumblers by a stenciling process, a stationary central support, a rotatable carriage mounted on said support for rotation thereon about the axis thereof, a plurality of normally vertical tumbler supporting chucks mounted for tilting movement on said carriage, means for rotating the carriage to move the chucks successively through tumbler receiving and removal and tumbler decorating zones, decorating instrumentalities positioned in the decorating zone including a horizontal beam pivoted at one end to the support for oscillation about the axis thereof, a vertical rock-shaft mounted for oscillation on the free end of said beam, a stencil screen assembly including a stencil screen mounted on said rock-shaft for oscillation therewith, a squeegee mounted on the beam and movable therewith, a sprocket on said rock-shaft, a sprocket on said support, a chain extending over said sprockets, means for oscillating said beam in timed relation to the rotation of the carriage, and means operable upon rotation of the carriage for tilting said chucks to cause the tumblers thereon to move into decorating relation with the stencil screen as the chucks move through the decorating zone.

13. In an apparatus for decorating tumblers by a stenciling process, a stationary central support, a rotatable carriage mounted on said support for rotation thereon about the axis thereof, a plurality of normally vertical tumbler supporting chucks mounted for tilting movement on said carriage, means for rotating the carriage to move the chucks successively through tumbler receiving and removal and tumbler decorating zones, decorating instrumentalities positioned in the decorating zone including a horizontal beam pivoted at one end to the support for oscillation about the axis thereof, a vertical rock-shaft mounted for oscillation on the free end of said beam, a stencil screen assembly including a stencil screen mounted on said rock-shaft for oscillation therewith, a squeegee mounted on the beam and movable therewith, a sprocket on said rock-shaft, a sprocket on said support, a chain extending over said sprockets, means for oscillating said beam in timed relation to the rotation of the carriage, means operable upon rotation of the carriage for tilting said chucks to cause the tumblers thereon to move into decorating relation with the stencil screen as the chucks move through the decorating zone, and means also operable upon rotation of the carriage for further tilting the chucks to cause the tumblers to clear the stencil screen as the chucks leave the decorating zone.

14. In an apparatus for decorating articles having curved surfaces by a stenciling process, decorating instrumentalities for applying decorations to the articles in a decorating zone including a movable stencil screen and a relatively stationary squeegee therefor, means for continuously and successively moving a series of articles through said zone, means for bodily moving said decorating instrumentalities in decorating relation to the articles passing through the zone, and means for moving said stencil screen relative to the squeegee during such movement of the decorating instrumentalities bodily.

15. In an apparatus for decorating tumblers and similar articles having tapered curved surfaces by a stenciling process, decorating instrumentalities for applying decorations to the articles in a decorating zone including an oscillatable stencil screen and a relatively stationary squeegee therefor, means for continuously and successively moving a series of the articles through said zone, means for bodily moving said decorating instrumentalities in decorating relation to the articles passing through the zone with the squeegee centered over the tangential lines of contact between the articles and screen, and means for oscillating said stencil screen relative to the squeegee during such movement of the decorating instrumentalities bodily.

HAROLD R. SCHUTZ.
LAWRENCE O. MANKIN.